United States Patent
Leaming

(10) Patent No.: US 7,369,982 B2
(45) Date of Patent: May 6, 2008

(54) MULTI-MODE SMART CARD EMULATOR AND RELATED METHODS

(75) Inventor: Taylor J. Leaming, Austin, TX (US)

(73) Assignees: STMicroelectronics, Inc., Carrollton, TX (US); Axalto (FR)

( * ) Notice: Subject to any disclaimer, the term of this patent is extended or adjusted under 35 U.S.C. 154(b) by 982 days.

(21) Appl. No.: 10/454,178

(22) Filed: Jun. 4, 2003

(65) Prior Publication Data
US 2004/0249625 A1    Dec. 9, 2004

(51) Int. Cl.
*G06F 9/455* (2006.01)
(52) U.S. Cl. .......................... 703/25; 703/28
(58) Field of Classification Search ................. 703/25, 703/28
See application file for complete search history.

(56) References Cited

U.S. PATENT DOCUMENTS

| | | | |
|---|---|---|---|
| 6,006,303 A | 12/1999 | Barnaby et al. | 710/244 |
| 6,122,676 A | 9/2000 | Brief et al. | 710/9 |
| 6,151,647 A * | 11/2000 | Sarat | 710/301 |
| 6,157,966 A | 12/2000 | Montgomery et al. | 710/8 |
| 6,157,975 A | 12/2000 | Brief et al. | 710/104 |
| 6,173,419 B1 * | 1/2001 | Barnett | 714/28 |
| 6,402,026 B1 | 6/2002 | Schwier | 235/379 |
| 6,439,464 B1 | 8/2002 | Fruhauf et al. | 235/492 |
| 6,463,537 B1 | 10/2002 | Tello | 713/182 |
| 6,523,081 B1 | 2/2003 | Karlsson et al. | 710/305 |
| 6,547,150 B1 | 4/2003 | Deo et al. | 235/492 |
| 2001/0056513 A1 | 12/2001 | Ueda | 710/100 |
| 2002/0066791 A1 | 6/2002 | Leydier et al. | 235/492 |

FOREIGN PATENT DOCUMENTS

| | | |
|---|---|---|
| WO | 00/16255 | 3/2000 |
| WO | 02/23357 | 3/2002 |

OTHER PUBLICATIONS

Information Technology-Identification Cards-Integrated Circuit(s) cards with Contacts, part 12: USB Interface and Operating Procedures, ISO/IEC 2002, pp. 1-19.

* cited by examiner

*Primary Examiner*—Paul Rodriguez
*Assistant Examiner*—Luke Osborne
(74) *Attorney, Agent, or Firm*—Lisa K. Jorgenson; Christopher P. Regan

(57) ABSTRACT

An emulator for a multi-mode smart card may include emulation circuitry for performing smart card applications in a plurality of operational modes. The emulator may also include a smart card connector to be connected to a smart card adapter operable in at least one of the plurality of operational modes. The smart card connector may include a plurality of contacts. Moreover, the emulator may further include a plurality of cable assemblies having first ends connected to the emulation circuitry, where each cable assembly is for a respective operational mode. Further, the emulator may also include an interface device connected between second ends of the plurality of cable assemblies and the smart card connector for selectively electrically connecting a selected cable assembly to predetermined ones of the contacts of the smart card connector based upon the at least one operational mode of the smart card adapter.

24 Claims, 4 Drawing Sheets

MULTI-MODE SMART CARD EMULATOR AND RELATED METHODS

FIELD OF THE INVENTION

The present invention relates to the field of information processing and storage, and, more particularly, to smart card emulators and related methods.

BACKGROUND OF THE INVENTION

Smart cards are becoming increasingly more popular for security and personal identification applications. For example, smart cards are currently used for storing sensitive data such as medical records, banking information, etc. In perhaps their most common form, smart cards have a card body which resembles a credit card in size, shape, and thickness, and they may even be made out of similar materials, such as plastic. Yet, rather than simply having a magnetic stripe to store sensitive information (e.g., account numbers, user identification, etc.) as standard credit cards do, smart cards generally include an integrated circuit (IC). The IC not only includes a non-volatile memory for storing such sensitive information, but it may also include a microprocessor for processing this information and communicating with a host device via a card reader, for example. Accordingly, not only can smart cards store more information than magnetic stripe cards, but they also have much greater functionality.

Various protocols have emerged to standardize the operation and communications of devices such as smart cards. One of the earliest of these was developed by the International Organization for Standardization (ISO) and is known as the ISO 7816-X protocol. In particular, this protocol is set forth in ISO documents ISO 7816-1 (Physical Characteristics), ISO 7816-2 (Dimensions and Locations of Contacts), ISO 7816-3 (Electronic Signals and Transmission Protocols), ISO 7816-10 (Electronic Signals and Answer to Reset for Synchronous Cards), and ISO 7816-12 (USB Interface) for example, all of which are hereby incorporated herein in their entirety by reference.

Furthermore, in response to the increasing popularity of the universal serial bus (USB) architecture, increasing numbers of smart cards continue to be developed which operate in accordance with the USB protocol. This protocol is set forth in the Universal Serial Bus Specification, Revision 2.0, Apr. 27, 2000, published by USB Implementers Forum, Inc., which is hereby incorporated herein in its entirety by reference. The USB architecture is particularly advantageous in that it provides a standard "plug and play" interface for devices external to a computer, for example. That is, external peripheral devices can be relatively quickly and easily installed and removed from a host device, such as a computer, without having to open or power down the computer.

As part of most product development cycles for complex computing systems or devices, it is often necessary to produce a functional equivalent of the product before the final product is available. This functional equivalent is typically referred to as an emulator, or hardware emulator (HWE). The HWE allows the application developers for the product to develop and debug software applications for the device while the product engineers finalize and test the physical circuitry and/or components of the product.

With respect to smart cards, a HWE emulator is commonly used to develop, test, and debug new applications which will ultimately become embedded in the final smart card integrated circuit. As such, it is desirable that the HWE provide functionality that matches as closely as possible the real-world functionality of the end product (e.g., a smart card integrated circuit). This can be somewhat difficult with respect to dual-mode smart cards, such as dual ISO/USB smart cards. One such dual mode smart card is described in U.S. Pat. No. 6,439,464 to Fruhauf et al., assigned to the assignee of the present invention, and which is hereby incorporated herein in its entirety by reference.

In particular, to develop embedded applications for a dual-mode ISO/USB smart card device, it is desirable that the HWE replicate as much of the functionality of both modes of operation as possible, including both ISO and USB communications. To accomplish faithful emulation in both modes of operation, the HWE is likely be outfitted with the functional equivalent of a smart card connector. That is, there will preferably be an appendage or cable assembly both electrically and mechanically connected to the main enclosure housing the internal circuitry of the HWE. This appendage then terminates in an adapter or connector which replicates the physical dimensions of the final product.

With typical prior art dual-mode HWEs, when the HWE is used in USB mode with a card form factor, the connector will be flat with metallic pads in the proper geometry so that it may be inserted into an appropriate USB card reader or adapter. The HWE may then recognize that it is to operate in USB mode. Similarly, when used in an ISO mode, the HWE's connector will terminate in a separate appendage (e.g., also with a card form factor) such that when it is inserted into an appropriate ISO card reader the HWE will recognize that it is to operate in ISO mode. In some cases the HWE may include yet another connector (i.e., a dongle form factor with a USB type A plug) also for use in USB Mode.

In other words, typical prior art HWEs require a separate appendage termination type for each of the anticipated end-customer usage models (Cardm, SIM, USB connector, etc.). This is in large part due to the differing electrical properties of the cabling required by the ISO, USB, and other similar specifications. In particular, the USB Specification defines three basic cable types for low-speed, full-speed, and high-speed devices. These cable types differ not only in the materials used for their construction, but also in the way in which they are assembled.

Moreover, while a low-speed USB Device can optionally use the more robust cable that is required for full-speed USB devices, full-speed and high-speed devices may not use the less complicated cabling of a low-speed USB device. This is because the USB cables are carefully specified to provide the best possible environment for transmitting data back and forth between a USB device and the USB reader to which it is connected.

As with USB cables, the construction and materials of an ISO cable are designed to provide the best environment for transmission and reception between a smart card and smart card adapter. However, the relative data rates of ISO differ significantly from those of USB, and thus the cables typically differ as well. Accordingly, because of the various connector types, impedance characteristics, capacitance characteristics, etc., the various cable types typically may not be substituted for one another.

Moreover, with respect to USB devices, transceivers are carefully designed and implemented to provide the best possible signals over the prescribed cables. The same is true of ISO transceivers as well. Thus, as with ISO and USB cable assemblies, data transceivers typically may not be substituted in place of one another between ISO an USB devices.

For the above reasons, smart card HWEs can be cumbersome to implement and use in terms of the requisite cabling and interface circuitry (or "pods") needed to accommodate multiple connection configurations and/or multiple operational modes.

SUMMARY OF THE INVENTION

In view of the foregoing background, it is therefore an object of the present invention to provide an emulator for multi-mode smart cards which provides more convenient interconnection with smart card adapters and related methods.

This and other objects, features, and advantages in accordance with the present invention are provided by an emulator for a multi-mode smart card which may include emulation circuitry for performing smart card applications in a plurality of operational modes. The emulator may further include a smart card connector to be connected to a smart card adapter operable in at least one of the plurality of operational modes. The smart card connector preferably includes a plurality of contacts. Further, the emulator may also include a plurality of cable assemblies having first ends connected to the emulation circuitry, where each cable assembly is for a respective operational mode. Additionally, the emulator may also include an interface device connected between second ends of the plurality of cable assemblies and the smart card connector for selectively electrically connecting a selected cable assembly to predetermined ones of the contacts of the smart card connector based upon the at least one operational mode of the smart card adapter.

Accordingly, multiple smart card connectors or appendages need not be used to provide multiple smart card operational modes, as the interface device advantageously detects the operational mode of the smart card adapter in question and performs the appropriate signal switching based thereon. Consequently, costly separate "pods", which would otherwise be required for each cable assembly of a multi-mode smart card emulator, may be avoided.

More particularly, the interface device may include mode detection circuitry connected to the plurality of contacts for detecting the at least one operational mode of the smart card adapter. The interface device may also include switching circuitry connected to the mode detection circuitry for selectively electrically connecting the selected cable assembly to the predetermined ones of the contacts based upon the detected at least one operational mode of the smart card adapter.

The mode detection circuitry may advantageously detect the at least one operational mode of the smart card adapter based upon signals generated by the smart card adapter on at least one of the contacts. The interface device may also further include a mode select switch connected to the mode detection circuitry. Accordingly, the mode detection circuitry may also detect the at least one operational mode of the smart card adapter based upon the mode select switch. The interface device may further provide a mode signal to the emulation circuitry indicating the at least one operational mode of the smart card adapter. Additional switches may be included for use by a developer to intervene "normal functionality." For example, when using USB mode, it might be advantageous to force a detachment or attachment of the emulation circuitry, or to induce a "reset" event.

In accordance with one particularly advantageous aspect of the invention, the interface circuitry may detect an authentication signal from the smart card adapter on at least one of the contacts, and prohibit access to the emulation circuitry by the smart card adapter until the authentication signal is detected. That is, the mode detection circuitry may check to make sure a host device attempting to access the emulation circuitry via the smart card adapter is a valid device which knows the appropriate authentication signal pattern, and that no attempt is being made to "hack" into proprietary smart card applications or architecture of the emulator.

The smart card connector may further include a smart card body carrying the plurality of contacts. By way of example, the plurality of operational modes may include an International Standards Organization 7816 (ISO 7816) operational mode and a Universal Serial Bus (USB) operational mode. Also, the emulation circuitry may advantageously be implemented in a field programmable gate array (FPGA), for example.

A smart card emulation system in also provided in accordance with the present invention. The system may include a host device, a smart card adapter connected to the host device and operable in at least one of the plurality of operational modes, and a multi-mode smart card emulator, such as the one described briefly above, for communicating with the host device via the smart card adapter.

A method aspect of the invention is for using emulation circuitry for a multi-mode smart card, where the emulation circuitry is for performing smart card applications in a plurality of operational modes. The method may include providing a smart card connector to be connected to a smart card adapter operable in at least one of the plurality of operational modes, where the smart card connector includes a plurality of contacts. The method may further include connecting first ends of a plurality of cable assemblies to the emulation circuitry, and connecting an interface device between second ends of the plurality of cable assemblies and the smart card connector. The interface device may then be used to selectively electrically connect a selected cable assembly to predetermined ones of the contacts of the smart card connector based upon the at least one operational mode of the smart card adapter.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and multiple prime notation are used to indicate similar elements in alternate embodiments.

Figure 1:
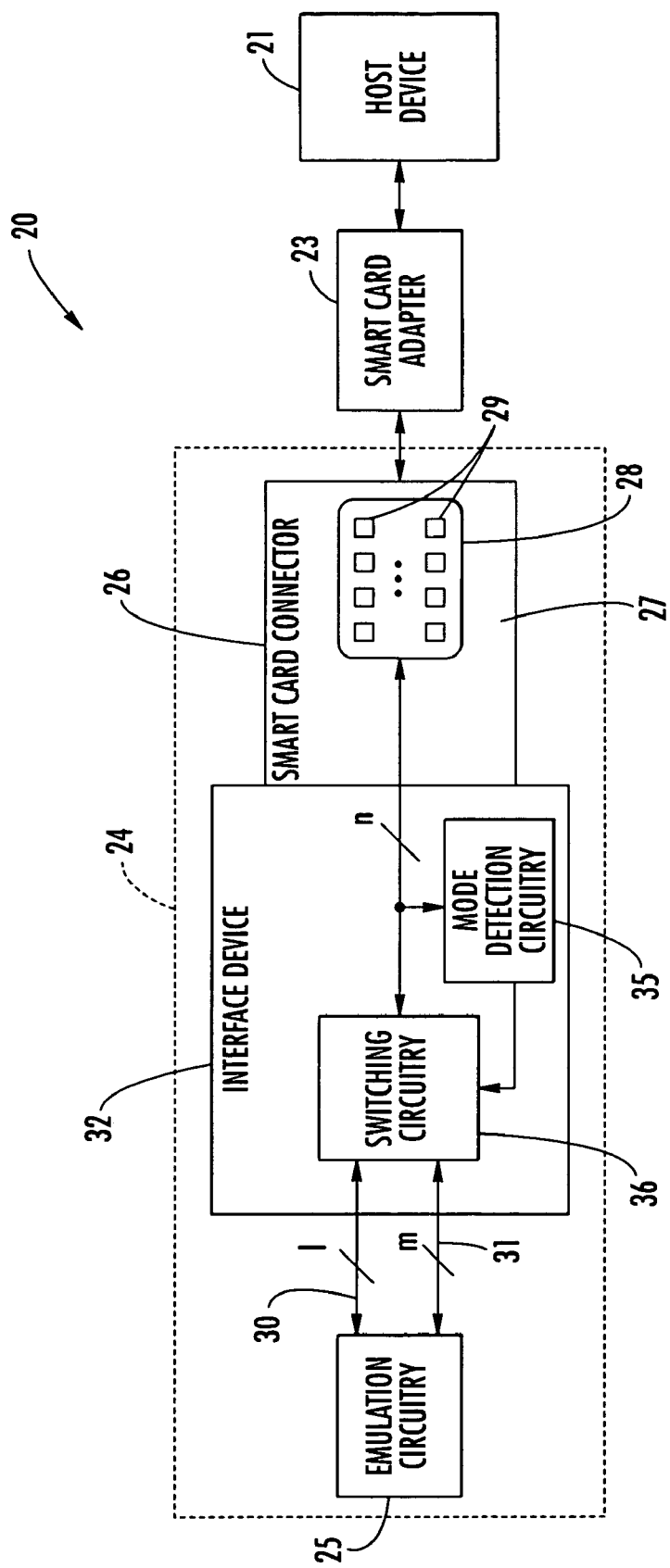
FIG. 1 is schematic block diagram of a multi-mode smart card emulation system in accordance with the present invention.

Referring initially to FIG. 1, a smart card emulation system 20 in accordance with the present invention illustratively includes a host device 21, a smart card adapter or reader 23 connected to the host device, and a multi-mode smart card emulator 24 for communicating with the host device via the smart card adapter. Generally speaking, the host device 21 will be a computer of some type, which could be a personal computer (PC), laptop, or other suitable device for performing tests on, or developing applications for use on, the smart card emulator 24.

The smart card adapter 23 is of a type compatible with the desired operating protocol or mode which the smart card emulator 24 is to emulate (e.g., an ISO 7816 type card reader, a USB type card reader, etc.). While a single smart card adapter 24 is illustratively shown for clarity of illustration, multiple readers 23 may be connected to the host device 21 for each of the operational modes of the smart card emulator 24. Of course, multi-purpose readers which operate in more than one operational mode may also be used, as will be appreciated by those of skill in the art.

In addition, the smart card adapter 23 can be remotely located with respect to the host device 21, but it need not be. That is, in some embodiments the smart card adapter 23 can be incorporated within the host device 21 or carried by a housing thereof, as will also be appreciated by those of skill in the art. Additionally, in some embodiments the smart card adapter 23 may be incorporated into a smart card integrated chip, reducing the reader essentially to a pass through connector, as will also be appreciated by those of skill in the art.

The emulator 24 illustratively includes emulation circuitry 25 for performing (i.e., emulating) the various smart card applications that are ultimately to be implemented in the final smart card product (e.g., a smart card integrated circuit) in the desired operational modes. For example, a smart card may have an embedded operating system capable of managing multiple concurrent (and embedded) applications (e.g., Java applets). These embedded applications may work in cooperation with the host-side applications (e.g., user log-in and authentication applications, Internet-based banking applications, digital rights management applications for audio/video transfer, etc.). Of course, numerous other applications may also be used in accordance with the present invention, as will be appreciated by those skilled in the art.

The emulator 24 also illustratively includes a smart card connector 26 to be connected to the smart card adapter 23. In particular, the illustrated smart card connector 26 includes a smart card body 27, a connector module 28 carried by the smart card body, and contacts 29 on the connector module for providing the electrical connection between the emulation circuitry and the smart card adapter 23.

In the exemplary embodiment, the connector module 28 is for a smart card form factor. In addition to a card form factor, in some embodiments the connector module 28 could be for a SIM or "token" type form factor, as will be appreciated by those of skill in the art. In any case, the same connector module 28 may be used for connection with a common ISO and USB reader type. For example, a standard ISO smart card connector module 28 with eight contacts 29 may also be used for connecting the emulator 24 with a USB smart card adapter, as will be explained further below. Of course, it should be noted that other connector/contact types may also be used in accordance with the present invention, such as a USB type A (or miniature type A) connector module 28, for example.

The emulator 24 also illustratively includes first and second cable assemblies 30, 31 having first ends connected to the emulation circuitry 25, and an interface device 32 connected between second ends of the cable assemblies and the smart card connector 26. The interface device is for selectively electrically connecting a selected cable assembly 30, 31 to predetermined ones of the contacts 29 based upon the operational mode of the smart card adapter 23.

In particular, each cable assembly 30, 31 is used for signal communications during a respective operational mode of the emulation circuitry 25. That is, when the emulation circuitry 25 is operating in a first operational mode, it will communicate with the smart card adapter 23 via the first cable assembly 30, and when it is in the second operational mode it will communicate via the second cable assembly 31, as will be explained further below.

The cable assemblies 30, 31 illustratively include l and m signal lines, respectively, which may be the same number (or not) depending on the operational modes being implemented. Moreover, a number n of the contacts 29 may also be different (or the same) as the number of signal lines l, m. That is, in some embodiments, there may be more contacts 29 than are needed for one or more of the operational modes, as will also be explained further below.

It should be noted that the multiple cable arrangement (and respective transceivers on both ends) could be replaced with a custom interface in some embodiments with the appropriate cabling assemblies included therein. Such an interface would preferably also take into account the "context" of usage of the interface device 32 (i.e., USB, ISO, Firewire, Ethernet, etc.), and produce a "clean" representation to the emulation circuitry 25. However, this may affect the "faithful" emulation of the end product to some extent.

The interface device 32 illustratively includes mode detection circuitry 35 connected to the contacts 29 for detecting the operational mode of the smart card adapter 23. In addition, the interface device 32 also illustratively includes switching circuitry 36 connected to the mode detection circuitry 35 for selectively electrically connecting the selected cable assembly 30, 31 to the predetermined ones of the contacts based upon the detected operational mode.

It will therefore be appreciated that with the smart card emulator 24 of the present invention, multiple smart card connectors 26 need not be used to provide multiple smart card operational modes. This is because the interface device 32 advantageously detects the operational mode of the smart card adapter 23 and performs the appropriate signal switching based thereon. Consequently, separate "pods," which would otherwise be required for each cable assembly of a multi-mode smart card emulator, may be avoided.

Figure 2:
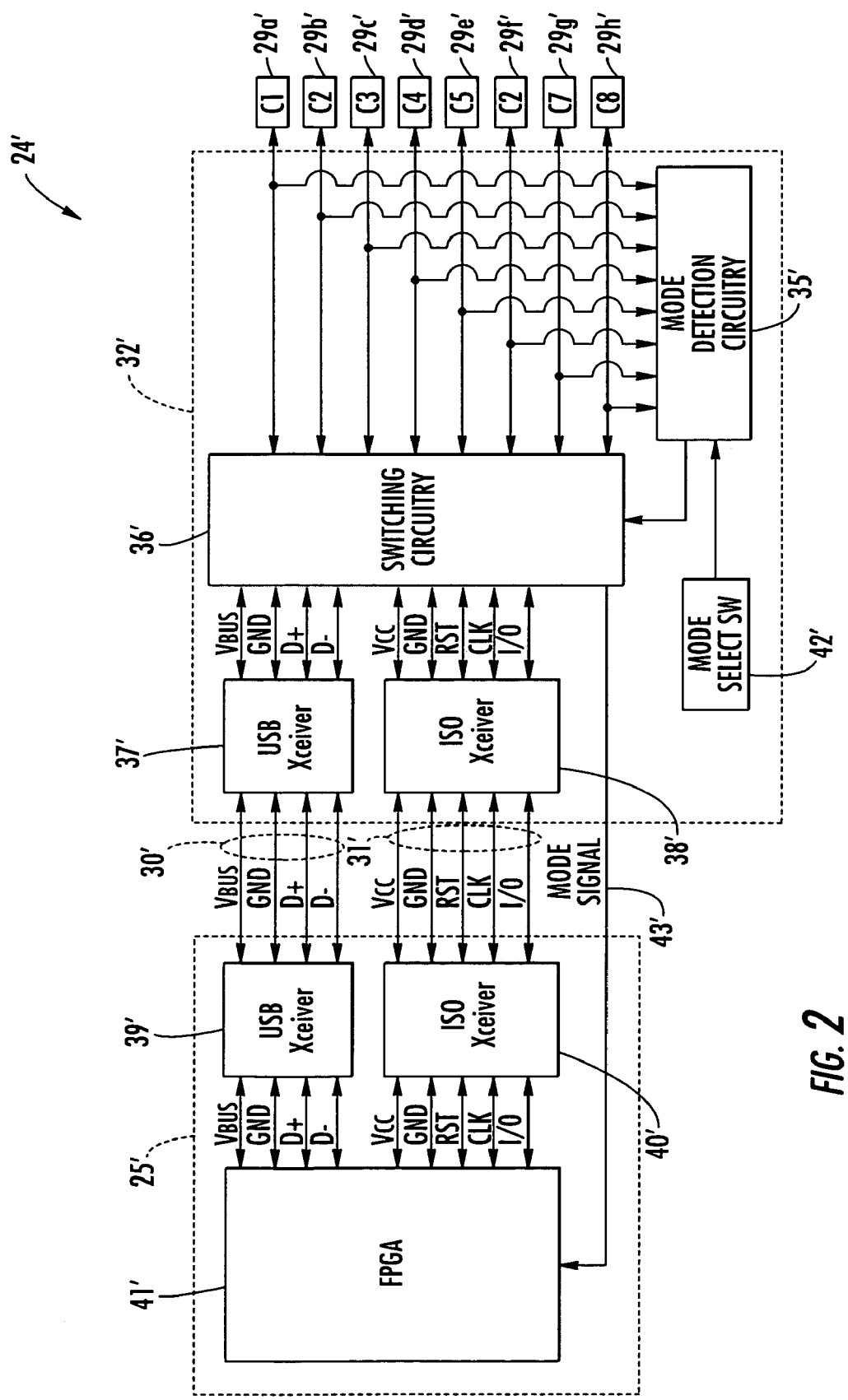
FIG. 2 is a schematic block diagram of a dual-mode ISO/USB embodiment of the smart card emulator illustrated in FIG. 1.

The foregoing will be further understood with reference to a particular dual mode ISO/USB embodiment of the emulator 24' illustratively shown in FIG. 2. As will be appreciated by those skilled in the art, the ISO 7816-2 specification requires up to eight connections C1-C8 between the smart card adapter 23 and the ISO smart card. In the illustrated example, the connections C1-C8 correspond to contacts 29a'-29h', respectively. The contact 29a' (C1) is assigned to the supply voltage $V_{CC}$, the contact 29b' (C2) is assigned to the reset signal RST, the contact 29c' (C3) is assigned to the clock signal CLK, the contact 29e' (C5) is assigned to the GND reference voltage, the contact 29f' (C6) is assigned to the variable supply voltage VPP, and the contact 29g' (C7) is assigned to data input/output (I/O).

In synchronous ISO 7816-10 applications, under type-2 operating conditions the contact 29d' (C4) is assigned to function code FCB, and the contact 29h' (C8) may also be used for other synchronous applications. Of course, the contact assignments may be different for different implementations, and not every contact 29a'-29h' is required for each implementation. For example, an asynchronous ISO smart card under class-B operating conditions does not require the voltage VPP on the contact 29f' (C6), whereas an asynchronous smart card under class-A operating conditions does. Further, a synchronous smart card under certain operating conditions may assign the contact 29h' (C8) to a fuse-zapping capability, for example.

On the other hand, USB operation generally requires only four signal connections between the host device 21 and the emulation circuitry 25'. In particular, the USB Specification calls for dedicated lines for an operating voltage VBus and ground GND. Thus, when in a USB operational mode, these signals can be mapped to the ISO supply voltage $V_{CC}$ contact 29a' (C1) and the ISO ground GND contact 29e' (C5), respectively, for example. Similarly, the USB Specification also requires the use of differential data signal lines D+ and D-, which can be mapped to the contacts 29d' (C4) and 29h' (C8), for example. The contacts 29c' (C3), 29f' (C6), and 29g' (C7) may be used for USB mode selection or other functions, for example. Of course, other mappings may be used as well, as will be appreciated by those skilled in the art.

For basic USB operation, the USB cable assembly 30' will require $V_{BUS}$, GND, D+, and D- signal lines, while basic ISO operation will require that the ISO cable assembly 31' include $V_{CC}$, GND, RST, CLK, and I/O signal lines, as illustratively shown. Of course, additional lines may be included for connection to any of the other contacts noted above if desired for a given application. As noted above, because of the varying requirements for USB and ISO cabling, it will likely be more cost effective to use separate "off-the-shelf" USB and ISO cable assemblies 30', 31', although such cable assemblies may be combined within a single bundle in some embodiments, if desired.

The interface device also illustratively includes a USB transceiver 37' and an ISO transceiver 38', and the emulation circuitry 25' illustratively includes corresponding USB and ISO transceivers 39', 40' for communicating therewith, respectively, over the above-noted signal lines when in the USB or ISO operations modes. Here again, it will likely be more cost effective to use separate off-the-shelf USB/ISO transceivers because of their individual signal requirements, but a custom combination transceiver could potentially be used in some embodiments, and even perhaps with different operational modes.

The emulation circuitry 25' also illustratively includes a field programmable gate array (FPGA) 41' for performing the various smart card applications to be implemented in the final integrated circuit, as noted above. Of course, it will be appreciated by those skilled in the art that other suitable circuitry may also be used.

Figure 3:
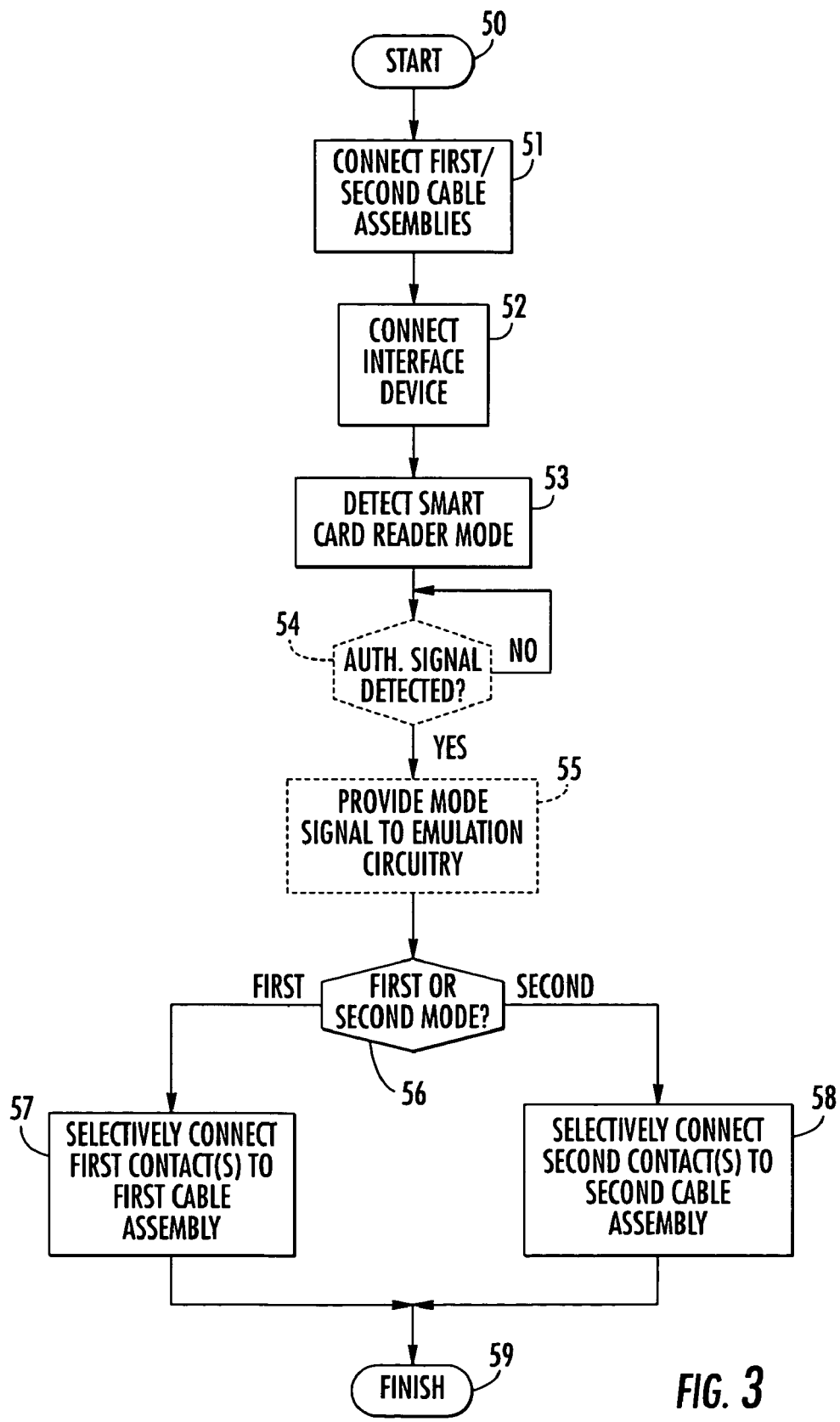
FIG. 3 is flow diagram illustrating a method in accordance with the present invention for using emulation circuitry for a multi-mode smart card.

Use of the emulator 24' and, more particularly, operation of the mode detection circuitry 35' and switching circuitry 36' will now be further described with reference to FIG. 3. Beginning at Block 50, the USB/ISO cable assemblies 30', 31' are connected between the interface device 32' and the emulation circuitry 25', at Blocks 51-52. The smart card connector 26 is then inserted into the smart card adapter 23, at which point the mode detection circuitry 35' detects if the smart card adapter is operating in a USB or ISO mode based upon certain indicators, at Block 53.

By way of example, when a start-up sequence is first initiated between an ISO smart card device and an ISO smart card adapter, certain signals or signal patterns will be presented by the host device 21 over the CLK and RST signal lines (i.e., on the contacts 29b' (C2) and 29c' (C3), respectively), as will be appreciated by those of skill in the art. As such, the mode detection circuitry 35' may detect these signal patterns as an indication that the smart card adapter 23 is operating in an ISO mode, for example. As an indication that the smart card adapter 23 is operating in a USB mode, the mode detection circuitry 35' may detect whether the signal lines used for D+ and D- are active (i.e., on the contacts 29d' (C4) and 29h' (C8), respectively), for example. Either one or both of these indicators (as well as other appropriate indicators) may be detected to determine the operational mode of the smart card adapter 23 (and, correspondingly, of the host device 21), as will be appreciated by those skilled in the art.

In the exemplary embodiment of the emulator 24', each of the contacts 29a'-29h' is illustratively shown as being connected to the mode detection circuitry 35', but they need not be in all embodiments. Moreover, in some embodiments it may be desirable to include a mode select switch 42' with the interface device 32' connected to the mode detection circuitry 35' so that a user can manually select a desired operational mode for the emulation circuitry 25'.

If the mode select switch 42' is included in a given embodiment, the mode detection circuitry 35' need not perform the "automatic" detection operation noted above, which would essentially simplify the mode detection circuitry to a simple interface or connection between the switch and the switching circuitry 36'. Of course, such functionality may also be included along with the switch 42', as illustratively shown, to enhance flexibility and ease of use in numerous emulation environments. By way of example, the mode select switch 42' may be a single-pole, single-throw (SPST) switch, although other suitable switches may also be used.

Figure 4:
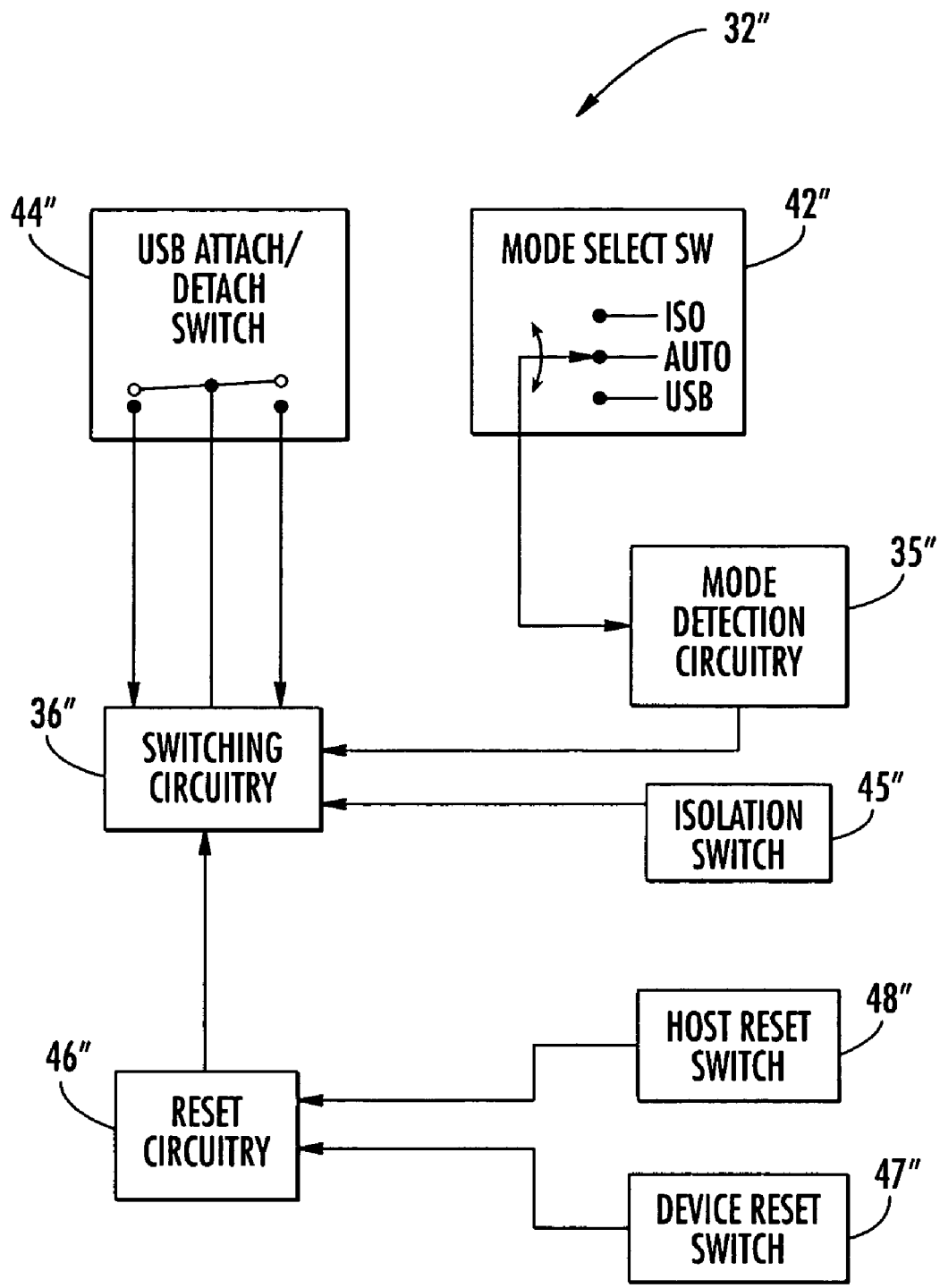
FIG. 4 is a schematic block diagram illustrating an alternate embodiment of the interface circuitry of the emulator of FIG. 2.

Turning now additionally to FIG. 4, another embodiment of the interface device 32" is illustratively shown which includes additional functionality in accordance with the present invention. For clarity of illustration, the interface device 32" is shown without the USB and ISO transceivers 37' and 38' illustrated in FIG. 3. First, the interface device 32"illustratively includes a USB attach/detach switch 44" which allows simulation of an attachment or detachment of a USB device, as seen by a USB host. In some embodiments, it may be desirable to allow the emulation circuitry 25' to control the switch 44". For example, this allows the emulation circuitry 25' to perform a self-initiated re-enumeration or other advantageous functions as described in co-pending U.S. patent application Ser. No. 10/829,008 filed Apr. 21, 2004; and U.S. patent application Ser. No. 10/829,007 filed Apr. 21, 2004, both of which are assigned to the present assignee and are hereby incorporated herein in their entireties by reference.

It should be noted, however, that the switch 44" is preferably implemented to provide mutually exclusive switching. That is, the switch 44" should only allow one of attachment or detachment at any given time, but not both. To do this, a two-pole momentary switch may be used, as shown in the illustrated example, although other suitable switching arrangements known to those of skill in the art may also be used.

Additionally, the mode select switch 42" may advantageously be implemented to allow a developer to control the functional mode of the emulation circuitry 25'. That is, the mode select switch 42" may be used to override automatic mode detection logic of the emulation circuitry 25', as illustratively shown. This may be particularly useful for some developmental and/or testing operations, as will be appreciated by those skilled in the art. For such an arrangement, the mode detection circuitry 35" preferably will not allow direct connectivity of emulation-side USB electronics to host-side ISO electronics, or vice-versa.

Furthermore, the interface device 32" also illustratively includes an isolation switch 45" for allowing a developer to force the interface device to provide complete electrical isolation between the emulation circuitry 25' and the host device 21. Optionally, the switch 45" may be used to force the emulation circuitry 25" into a known configuration, for example. Another use for the switch 45" is to indicate to both the host device 21 and/or the emulation circuitry 25' that a particular function is not present or has been disconnected, for example.

The interface device 32" may also provide various reset features via reset circuitry 46". On the emulator side, a device reset switch 47" may be used to provide a protocol reset for the emulation circuitry 25". For USB operation, for example, this may take the form of a prolonged sequence on the D+/D– lines, as will be appreciated by those skilled in the art. For ISO operation, such a reset may take the form of a relatively short click or activation of the switch 47", as will also be appreciated by those skilled in the art.

In other embodiments, the device reset switch 47" could also be used to indicate a hard reset for detection by the emulation circuitry 25'. That is, for either USB or ISO operation, such an indication could be used to cause the emulation circuitry 25' to completely reset itself. For example, this could be done using a relatively long click or activation of the switch 47". It should be noted that in such case it may be advantageous for the interface device 32" to provide an appropriate electrical indicator to the host device 21.

On the host side, a host reset switch 48" may be used to indicate to the host device 21 that the emulation circuitry 25" has reset itself. For example, a relatively short click or activation of the reset switch 48" may be used for this purpose. For USB operation, the host device 21 might see apparent device de-attachment (and possibly disconnection), followed by apparent device attachment (following a possible connection). For ISO operation, the host device 21 might see the apparent device removal, followed by apparent device insertion. It should be noted that in some embodiments it may be necessary to account for any physical card presence sensors, as will be appreciated by those skill in the art. Again, it may be advantageous for the interface device 32" to provide an appropriate electrical indicator to the emulation circuitry 25" when such a reset has been initiated.

The switch 48" may also be used to indicate a hard reset (e.g., such as with a relatively long click or activation). This allows a developer to induce detection by the host device 21 to perform its prescribed reset behavior. That is, such action will force an ISO card reader to reset, or force the host device 21 to reset, for example. Another option is to induce a protocol reset, which allows a developer to precipitate a protocol reset from the host device 21 (which is seen by the emulation circuitry 25'). This feature will depend somewhat one the operational mode of the currently emulated environment (i.e., USB, ISO, etc.). That is, the host device 21 may perceive functional/protocol/physical circumstances which would cause it to generate an appropriate protocol reset based upon the particular operational mode.

For security reasons, it may be desirable in some situations to authenticate that the host device 21 is authorized to access the emulation circuitry 25'. That is, in some instances the emulation circuitry 25' may not have all of the normal security measures in place which would otherwise be present in the final IC product. Accordingly, an unauthorized user may otherwise be able to access proprietary operational data unless certain precautions are taken. Thus, the mode detection circuitry 35' may advantageously check to make sure the host device 21 attempting to access the emulation circuitry 25' is a valid device which knows an appropriate authentication signal (or signal pattern), and no attempt is being made to hack into proprietary smart card applications or architecture implemented in the emulator 24'.

Indeed, it is common practice among development tool companies to use some sort of key to access the functionality of its tools. This key may take a physical form (e.g., a dongle connector plugged into the parallel port of a computer), or electronic form (e.g., a license file or digital certificate), or both. When developing for a secure product (such as a smart card), it follows that the development environment also should be secure. This is especially so when details of a closely-guarded intellectual property block, such a very secure embedded operating system, for example, are in use.

Thus, the mode detection circuitry 35' optionally detects the authentication signal(s) from the smart card adapter 23 on one or more of the connectors 29a'-29h', at Block 54. This could take the form of a secure key or other suitable secure identifier, for example. Thus, as illustratively shown, if the proper authentication signal(s) is not detected by the mode detection circuitry 35', then it prohibits access by the host device 21 to the emulation circuitry 25' via the smart card adapter 23. Authentication could also be performed via a dedicated "port" where a SIM module could be inserted, for example, as an enabling key, as will be appreciated by those of skill in the art.

Otherwise, the mode detection circuitry 35' then preferably provides a mode detection signal to the FPGA 41' to indicate the mode in which it is to begin operating. This signal could be provided to the FPGA 41' via a dedicated line 43', as illustratively shown, or via one of the signal lines on the cable assemblies 30', 31' (e.g., the D+/D– lines for USB operation, or the RST, CLK, or I/O lines for ISO operation).

If the USB operational mode is detected, the mode detection circuitry 35' then causes the switching circuitry 36' to connect the appropriate contacts with the USB transceiver 37' to facilitate USB communications, at Block 57. Likewise, if the ISO operational mode is detected, the mode detection circuitry 35' causes the switching circuitry 36' to connect the appropriate contacts with the ISO transceiver 38', at Block 58, thus concluding the illustrated method (Block 59).

Depending upon the given operational modes the emulation circuitry 25 is to support, the implementation of the mode detection circuitry 35 and switching circuitry 36 may vary somewhat. By way of example, the mode detection circuitry 35 may be implemented using the appropriate control logic, FPGA, etc., configured to perform the detection (and optional security) functions noted above. The various circuitry of the interface device 32 may be implemented on a circuit board, for example, which accommodates the various tolerances of the supported operational protocols, as will be appreciated by those skilled in the art. It may be desirable in some embodiments to support the "legacy" ISO emulation, complete with physical and electrical specifications adherence, as will also be appreciated by those skilled in the art.

With respect to the switching circuitry 36, certain design considerations may need to be taken into account depending on the given embodiment. For the case of a dual USB/ISO implementation, the ISO and USB specifications define the physical electromechanical mechanisms by which a connection is made between a smart card and reader (ISO) and a device and a hub (USB). (It should be noted that the term "smart card adapter" as used herein includes not only ISO readers but also USB "hubs" as well as other similar connection devices for different operational protocols).

Generally speaking, the switching circuitry 36 will include analog switches which allow two (or more) different interfaces to be connected with a common terminating adapter (although digital switching may be used in some embodiments). As such, these analog switches should be appropriately designed for the particular operational modes in question to provide adherence to the electrical specifications (voltages, current, waveform shape and dispersion, etc.) of the various protocols, as will be appreciated by those of skill in the art.

U.S. patent application Ser. No. 09/686,327 to Fruhauf et al., which is assigned to the assignee of the present invention and is hereby incorporated herein in its entirety by reference, discloses a dual-mode smart card including circuitry for use in detecting ISO or non-ISO (i.e., USB) operation, and for routing signals appropriately based thereon. Similar circuitry may also be used in accordance with the present invention for the mode detection circuitry 35 and/or switching circuitry 36, as will be appreciated by those skilled in the art, although other suitable circuitry may also be used.

Although the invention has been described with particular reference to a dual USB/ISO implementation, it will be appreciated that the emulator 24 of the present invention may be used for other exemplary operational modes, as well as more than two operational modes. Other exemplary operational modes or protocols that may be implemented in accordance with the invention include FireWire/FireWire2, Ethernet, 10/100/1000BaseT, fiber optics, fiber channel, etc. Generally speaking, the present invention is well suited for technologies which attempt to move data in a serial fashion at relatively high data rates, as well as others.

Numerous advantages and features of the invention will be apparent from the foregoing discussion. First, the emulator 24 provides for relatively seamless integration of an HWE into a real-world usage model without undue multiplication of adapters and cabling. As such, the present invention provides a cost-effective solution to reducing the amount of redundant external clutter (i.e., cables, pods, terminating adapters, etc.), while still addressing the physical, electrical, and mechanical requirements of the various interfaces between the HWE and the expected reader devices. As such, the emulator 24 may advantageously allow relatively simple and easy transition between these interfaces from the end-user perspective, plus make these transitions in a relatively seamless fashion to the functionality that is embodied inside the emulator 24, and with relatively little custom design work to implement.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

The invention claimed is:

1. An emulator for a multi-mode smart card comprising:
   emulation circuitry for performing smart card applications in a plurality of operational modes;
   a smart card connector to be connected to a smart card adapter operable in at least one of the plurality of operational modes, said smart card connector comprising a plurality of contacts;
   a plurality of cable assemblies having first ends connected to said emulation circuitry, each cable assembly for a respective operational mode; and
   an interface device connected between second ends of said plurality of cable assemblies and said smart card connector for selectively electrically connecting a selected cable assembly to predetermined ones of said contacts of said smart card connector based upon the at least one operational mode of the smart card adapter and comprising
      an operating mode detection circuit connected to said plurality of contacts for detecting at least one signal pattern of the smart card adapter corresponding to the operational mode of the smart card adapter, and
      a switching circuit connected to said operating mode detection circuit for selectively switching signals from the selected cable assembly to the predetermined ones of said contacts based upon the detected at least one signal pattern of the smart card adapter.

2. The emulator of claim 1 wherein said mode detection circuitry detects the at least one operational mode of the smart card adapter based upon signals generated by the smart card adapter on at least one of said contacts.

3. The emulator of claim 1 wherein said interface device further comprises a mode select switch connected to said mode detection circuitry, and wherein said mode detection circuitry detects the at least one operational mode of the smart card adapter based upon said mode select switch.

4. The emulator of claim 1 wherein said interface device provides a mode signal to said emulation circuitry indicating the at least one operational mode of the smart card adapter.

5. The emulator of claim 1 wherein said interface circuitry detects an authentication signal from the smart card adapter on at least one of said contacts; and wherein said interface circuitry prohibits access to said emulation circuitry by the smart card adapter until the authentication signal is detected.

6. The emulator of claim 1 wherein said smart card connector further comprises a smart card body carrying said plurality of contacts.

7. The emulator of claim 1 wherein the plurality of operational modes comprise an International Standards Organization 7816 (ISO 7816) operational mode and a Universal Serial Bus (USB) operational mode.

8. The emulator of claim 1 wherein said emulation circuitry comprises a field programmable gate array (FPGA).

9. The emulator of claim 1 wherein said interface device comprises a user-operable isolation switch for allowing a user to electrically isolate said emulation circuitry from the smart card adapter.

10. The emulator of claim 1 wherein said interface device comprises a reset switch for causing said emulation circuitry to perform a reset operation.

11. An emulation system for a multi-mode smart card comprising:
   a host device;
   a smart card adapter connected to said host device and operable in at least one of a plurality of operational modes; and a multi-mode smart card emulator for communicating with said host device via said smart card adapter and comprising emulation circuitry for performing smart card applications in the plurality of operational modes, a smart card connector to be connected to said smart card adapter, said smart card connector comprising a plurality of contacts, a plurality of cable assemblies having first ends connected to said emulation circuitry, each cable assembly for a respective operational mode, and an interface device connected between second ends of said plurality of cable assemblies and said smart card connector for selectively electrically connecting a selected cable assembly to predetermined ones of said contacts of said smart card connector based upon the at least one operational mode of the smart card adapter and comprising an operating mode detection circuit connected to said plurality of contacts for detecting at least one signal pattern of the smart card adapter corresponding to the operational mode of the smart card adapter, and a switching circuit connected to said operating mode detection circuit for selectively switching signals from the selected cable assembly to the predetermined ones of said contacts based upon the detected at least one signal pattern of the smart card adapter.

12. The emulation system of claim 11 wherein said mode detection circuitry detects the at least one operational mode of the smart card adapter based upon signals generated by the smart card adapter on at least one of said contacts.

13. The emulation system of claim 11 wherein said interface device further comprises a mode select switch connected to said mode detection circuitry, and wherein said mode detection circuitry detects the at least one operational mode of the smart card adapter based upon said mode select switch.

14. The emulation system of claim 11 wherein said interface device provides a mode signal to said emulation circuitry indicating the at least one operational mode of the smart card adapter.

15. The emulation system of claim 11 wherein said interface circuitry detects an authentication signal from the smart card adapter on at least one of said contacts; and wherein said interface circuitry prohibits access to said emulation circuitry by the smart card adapter until the authentication signal is detected.

16. The emulation system of claim 11 wherein said smart card connector further comprises a smart card body carrying said plurality of contacts.

17. The emulation system of claim 11 wherein the plurality of operational modes comprise an International Standards Organization 7816 (ISO 7816) operational mode and a Universal Serial Bus (USB) operational mode.

18. The emulation system of claim 11 wherein said emulation circuitry comprises a field programmable gate array (FPGA).

19. The emulation system of claim 11 wherein said interface device comprises an user-operable isolation switch for allowing a user to electrically isolate said emulation circuitry from the smart card adapter.

20. The emulation system of claim 11 wherein said interface device comprises a reset switch for causing said emulation circuitry to perform a reset operation.

21. A method for using emulation circuitry for a multi-mode smart card, the emulation circuitry for performing smart card applications in a plurality of operational modes, the method comprising:

providing a smart card connector to be connected to a smart card adapter operable in at least one of the plurality of operational modes, the smart card connector comprising a plurality of contacts;

connecting first ends of a plurality of cable assemblies to the emulation circuitry;

connecting an interface device between second ends of the plurality of cable assemblies and the smart card connector; and using the interface device to selectively electrically connect a selected cable assembly to predetermined ones of the contacts of the smart card connector based upon the at least one operational mode of the smart card adapter and comprising using the interface device to detect the at least one operational mode of the smart card adapter based upon signals generated by the smart card adapter on at least one of the contacts, wherein the interface device comprises a mode select switch; and further comprising detecting the at least one operational mode of the smart card adapter based upon the mode select switch.

22. The method of claim 21 further comprising using the interface device to provide a mode signal to the emulation circuitry corresponding to the operational mode of the smart card adapter.

23. The method of claim 21 further comprising:

detecting an authentication signal pattern from the smart card adapter on at least one of the contacts using the interface device; and prohibiting access to the emulation circuitry by the smart card adapter using the interface device until the authentication signal pattern is detected.

24. The method of claim 21 wherein the plurality of operational modes comprise an International Standards Organization 7816 (ISO 7816) operational mode and a Universal Serial Bus (USB) operational mode.

* * * * *